(12) United States Patent
Falahi (10) Patent No.: US 12,325,306 B2
(45) Date of Patent: Jun. 10, 2025

(54) MOTOR-WHEEL FOR AN OMNI-DIRECTIONAL MECHANISM AND VEHICLE USING THE SAME

(71) Applicant: Ecole Polytechnique Fédérale de Lausanne (EPFL), Lausanne (CH)

(72) Inventor: Mohsen Falahi, Sullens (CH)

(73) Assignee: ECOLE POLYTECHNIQUE FÉDÉRALE DE LAUSANNE, Lausanne (CH)

( * ) Notice: Subject to any disclaimer, the term of this patent is extended or adjusted under 35 U.S.C. 154(b) by 689 days.

(21) Appl. No.: 17/436,329

(22) PCT Filed: Mar. 4, 2020

(86) PCT No.: PCT/EP2020/055694
§ 371 (c)(1),
(2) Date: Sep. 3, 2021

(87) PCT Pub. No.: WO2020/178337
PCT Pub. Date: Sep. 10, 2020

(65) Prior Publication Data
US 2022/0169107 A1  Jun. 2, 2022

(30) Foreign Application Priority Data

Mar. 5, 2019 (EP) ................................. 19160735

(51) Int. Cl.
*B60K 7/00* (2006.01)
*B60B 19/00* (2006.01)

(52) U.S. Cl.
CPC .......... *B60K 7/0007* (2013.01); *B60B 19/003* (2013.01)

(58) Field of Classification Search
CPC ............................ B60B 19/003; B60K 7/0007
See application file for complete search history.

(56) References Cited

U.S. PATENT DOCUMENTS

| 4,715,460 A | * | 12/1987 | Smith | B60B 19/003 |
| | | | | 180/7.1 |
| 7,641,288 B1 | * | 1/2010 | Baker | B60B 19/125 |
| | | | | 16/45 |
| 9,365,076 B2 | * | 6/2016 | Bando | B60B 19/003 |

(Continued)

FOREIGN PATENT DOCUMENTS

| CN | 108438095 A | 8/2018 |
| CN | 108749482 A | 11/2018 |

(Continued)

OTHER PUBLICATIONS

International Search Report for PCT No. Application PCT/EP2020/055694, Apr. 28, 2020.

*Primary Examiner* — Jason R Bellinger
(74) *Attorney, Agent, or Firm* — DINSMORE & SHOHL LLP (57) ABSTRACT

Provided herein is a motor-wheel for an omni-directional motion vehicle. The motor-wheel generally includes a ring-shaped structure with a central axis, presenting an outer radial surface and an inner radial surface, whereby the outer radial surface includes a plurality of rollers that are rotatable about an inclined axis relative to the central axis, and the inner radial surface is adapted to be connected to a hub-motor such that the hub-motor is a load bearing element of the wheel.

13 Claims, 5 Drawing Sheets

(56) References Cited

U.S. PATENT DOCUMENTS

| | | | | |
|---|---|---|---|---|
| 10,245,945 | B2* | 4/2019 | Xiong | B60B 19/003 |
| 10,406,854 | B2* | 9/2019 | Zhang | B60B 19/003 |
| 10,696,115 | B2* | 6/2020 | Bartlett | B66F 9/07559 |
| 10,850,559 | B2* | 12/2020 | Nakamura | B60B 27/0015 |
| 11,498,202 | B2* | 11/2022 | Yan | B25J 5/007 |
| 2009/0065113 | A1* | 3/2009 | Gunther | B60B 19/125 |
| | | | | 152/1 |
| 2015/0190927 | A1* | 7/2015 | Sutherland | B25J 5/007 |
| | | | | 901/1 |
| 2018/0162478 | A1* | 6/2018 | Silverwood | B60K 7/00 |
| 2018/0236813 | A1* | 8/2018 | Ochiai | B60B 11/02 |
| 2020/0079146 | A1* | 3/2020 | Wang | B60B 19/003 |
| 2021/0252910 | A1* | 8/2021 | Wang | B60B 19/003 |

FOREIGN PATENT DOCUMENTS

| | | |
|---|---|---|
| DE | 102016010374 A1 | 4/2017 |
| DE | 102016218674 A1 | 3/2018 |
| RO | 128285 A2 | 4/2013 |
| WO | 1995/00352 A1 | 1/1995 |
| WO | 2016/109867 A1 | 7/2016 |
| WO | 2017/164926 A1 | 9/2017 |

* cited by examiner

MOTOR-WHEEL FOR AN OMNI-DIRECTIONAL MECHANISM AND VEHICLE USING THE SAME

CROSS REFERENCE TO RELATED APPLICATIONS

This application is a U.S. National Stage under 35 U.S.C. § 371 of PCT/EP2020/055694 filed Mar. 4, 2020, which depends from and claims priority to EP Application Serial No. 19160735.7 filed Mar. 5, 2019, the entire contents of which are incorporated herein by reference.

TECHNICAL FIELD

The present invention relates to a motor-wheel for a motion mechanism and more particularly to a motor-wheel for an omni-directional motion mechanism and a vehicle using the same.

BACKGROUND OF THE ART

Omni-directional motion mechanisms and wheels have been developed mostly in the past forty years. Technically, they have been referred to as "holonomic" wheeled motion mechanisms as they provide three degrees of freedom on a plane.

Having one more degree of freedom in such mechanisms provides higher maneuverability to these mechanisms in comparison to any other wheeled mechanism. The most common technique to achieve a holonomic wheeled motion mechanism is to use multi-directional wheels. Mecanum and omni wheels are the most commonly used wheels in this category. More particularly, an omni or mecanum wheel essentially consists of a wheel with small discs, also called rollers, placed around the circumference of the wheel and which are perpendicular to the turning direction In case of omni directional wheel or angled to the turning direction in case of mecanum wheels. The effect is that the wheel can be driven with full force, but will also slide laterally with great ease.

However, these wheels have not been used widely in the existing products on the market as the manufacturing and maintenance of these wheels are more expensive and technically complicated in comparison to other wheels and mechanisms.

In addition to the manufacturing and maintenance issues, these wheels have not been upgraded to be used with new motor technologies. Also, the existing omni-directional and mecanum wheels are designed to be attached to motors with a shaft which rotates according to the motor control. Hence, there is a small hole in the center of the wheel to which the motor can be connected to through the shaft. Traditionally, motors and wheels have been attached using the shaft of the motor which render them very fragile.

Indeed, since traditionally, the strength of the wheel has been supported by the wheel's structure and if high strength is needed, the thickness of the wheel should increase which increases the cost.

A further problem regards the rollers which can be easily damaged and which, once damaged, need a replacement of the entire wheel.

In this regard, a primary object of the invention is to solve the above-mentioned problems and more particularly to provide omni-directional motion mechanism with more robustness and high modularity.

SUMMARY OF THE INVENTION

The above problems are solved by the present invention.

The present invention relates to an omni-directional and mecanum wheel which is compatible with hub motors. The present invention can be used for holonomic wheeled motion mechanisms, including personal transportation devices, robots, household devices, vehicles etc. Indeed, a preferred embodiment of the present invention uses hub motors or so called "in-wheel motors". Connecting the motor and the wheel is challenging because these motors haven't been used with omni-wheels as the wheels are not made to connect to such motors. There is therefore a need for a product which can be used to connect a hub motor to an omni-wheel.

In order to provide such a device, the inventors have rebuilt the whole structure of the wheel of the present invention so as to present a ring-shape, with a hollow portion in the center, which gives enough space for housing an in-wheel motor which passes through and gets attached to the wheel. Doing so, it also enhances the robustness of the wheel because the strength of an in-wheel motor's structure is very highly based on the common materials used in these motors. In the present invention, since the motor will carry the pressure and load on the wheel, and since the structure of our wheel is ring-type, it is much stronger in comparison to any other wheel of the prior art.

As mentioned before, since the wheel has a ring-shaped structure, most of the volume of the wheel is null and empty. Removing most of the wheel and replacing it with the motor enables to produce a wheel with much less material in comparison to the traditional structure which is disk-shaped. Obviously, when one uses less material, the production cost drops.

Another aspect of the invention relates to the rollers which are preferably independent from each other and detachably fixed to the wheel structure preferably through the use of at least two screws which can be removed so as to remove the damaged roller and replace it with a new one.

More particularly, the invention relates to a motor-wheel for an omni-directional motion vehicle, comprising a ring-shaped structure with a central axis, presenting an outer radial surface and an inner radial surface, whereby the outer radial surface comprises a plurality of rollers that are rotatable about an inclined axis relative to the central axis, and the inner radial surface is adapted to be connected to a hub-motor such that the hub-motor is a load bearing element of the wheel.

According to a preferred embodiment of the present invention, the ring-shaped structure comprises two rings adapted to be assembled together so as to sandwich said hub-motor within a housing partially surrounded by their inner radial surfaces.

Advantageously, each ring presents a plurality of recess portions adapted to receive the rollers. In this manner, the rollers are at least partially protected.

Preferably, the motor-wheel comprises two sets of rollers, each set of rollers being mounted on one ring of the ring-shaped structure. Thus, modularity is enhanced and the load is shared between the two rings.

According to a preferred embodiment of the present invention, at least one set of rollers comprises rollers which are independent from each other. In this manner, each roller can be changed one-by-one if damaged.

Advantageously, at least one set of rollers comprises at least some rollers which are linked to each other through a common rotating axis. In this manner, each roller handling is easy.

Preferably, the roller axis is perpendicular to the central axis. Thus control is improved.

According to a preferred embodiment of the present invention, the rollers are detachably mounted on the ring shaped structure. In this manner the rollers can be easily replaced.

Preferably, the rollers are detachably mounted on the ring-shaped structure through the use of screws. Thus, the rollers are easily fixed.

Advantageously, the rollers are detachably mounted on the ring-shaped structure through the use of holders fixed by the screws. Thus, the rollers are firmly fixed.

According to a preferred embodiment of the present invention, the screws also maintain the two rings together. Therefore, the wheel needs less fixing means.

Preferably, the motor-wheel further comprises a hub motor located within the housing partially surrounded by their inner radial surfaces so as to become a load bearing element of the wheel. Therefore, the structural strength of the wheel is increased.

Advantageously, the hub motor comprises a rotor fixed to the ring shaped structure and a stator comprising a shaft and adapted to be fixed to vehicles. Therefore, the motor is reliable.

A second aspect of the invention relates to an omni-directional motion vehicle comprising a base plate and at least three motor-wheels according to the first embodiment of the invention. The particular advantages of this device of the invention being similar to the ones of the method of the first aspect of the invention, they will not be repeated here.

Preferably, the three wheels are disposed in the same horizontal plane and spaced by 120° between them. Therefore, the stability of the vehicle is enhanced.

Furthermore, this invention has the following advantages:

The proposed omni-directional wheel of the present invention can be used along with hub-motors.

The structural strength of the wheel has been increased while the other existing wheels do not consider this parameter.

The weight of the wheel has been decreased as less material is needed for the production of this wheel compared to any other wheel of the same size.

The manufacturing cost of the wheel drops as less material is needed for production.

The rollers on the wheel have been designed in a modular manner, and can be replaced one by one in case of damage, without changing the whole wheel. This feature decreases the maintenance cost of the wheel and renders the replacements in the wheel much easier.

BRIEF DESCRIPTION OF THE DRAWINGS

Further particular advantages and features of the invention will become more apparent from the following non-limitative description of at least one embodiment of the invention which will refer to the accompanying drawings, wherein.

DETAILED DESCRIPTION OF THE INVENTION

The present detailed description is intended to illustrate the invention in a non-limitative manner since any feature of an embodiment may be combined with any other feature of a different embodiment in an advantageous manner.

Figure 1A:
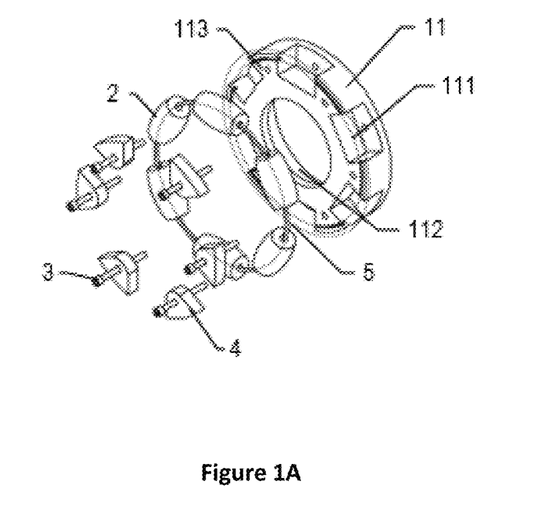
FIGS. 1A and 1B show exploded isometric and side views of a ring structure of the wheel assembly and its connection to the rollers through the screws and the holders according to a first embodiment of the present invention.
Figure 1B:
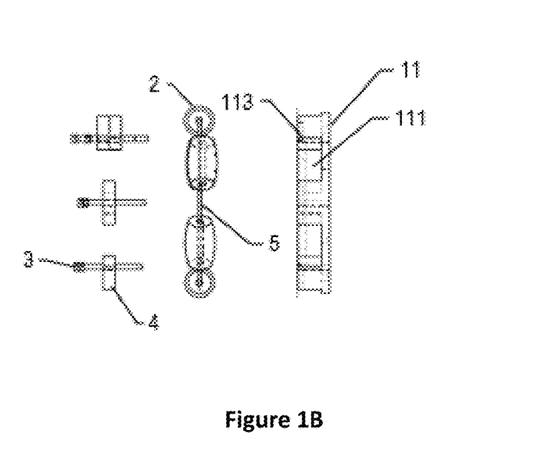

FIGS. 1A and 1B show an exploded isometric view and an exploded side view of a ring structure 11 of an omni wheel assembly and its connection to rollers 2 with screws 3 and holders 4 according to a first embodiment of the present invention. The ring structure presents an inner radial surface 112, recesses 111 for receiving the rollers 2 and holes 113 for receiving the screws 3. In this embodiment, the rollers 2 are connected to a common shaft 5.

Figure 2:
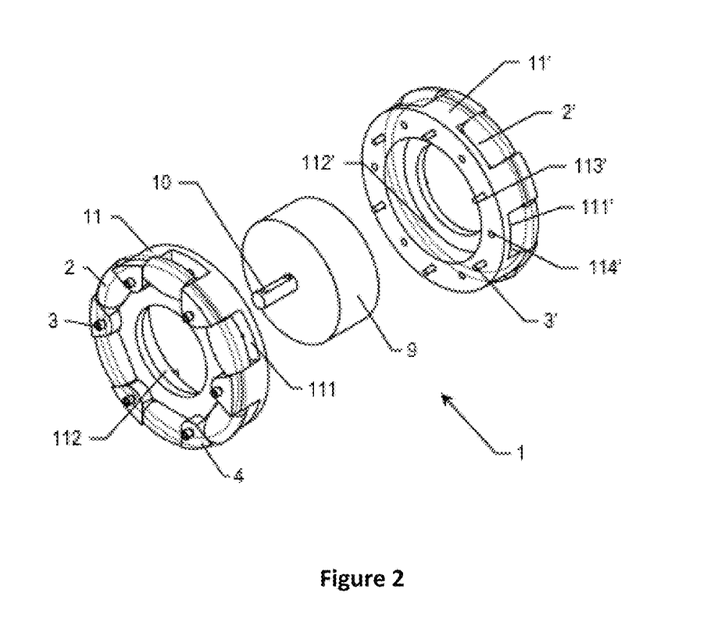
FIG. 2 shows an isometric view of the ring structure to be attached to the hub motor according to the first embodiment of the present invention.
Figure 3:
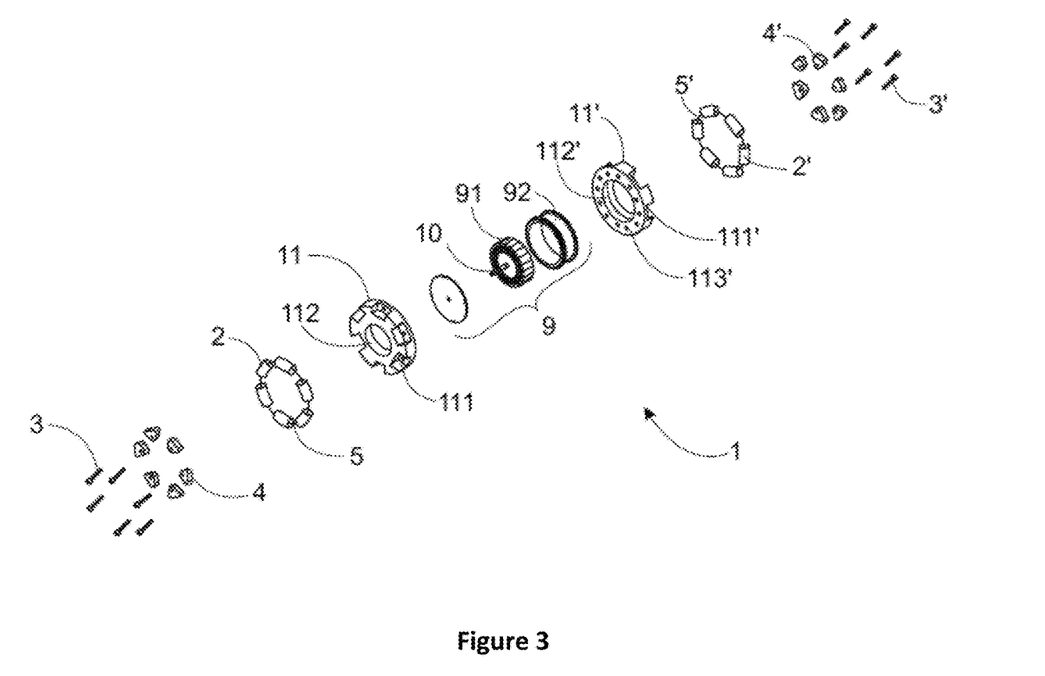
FIG. 3 shows an exploded isometric views of a complete wheel according to a first embodiment of the present invention.
Figure 4A:
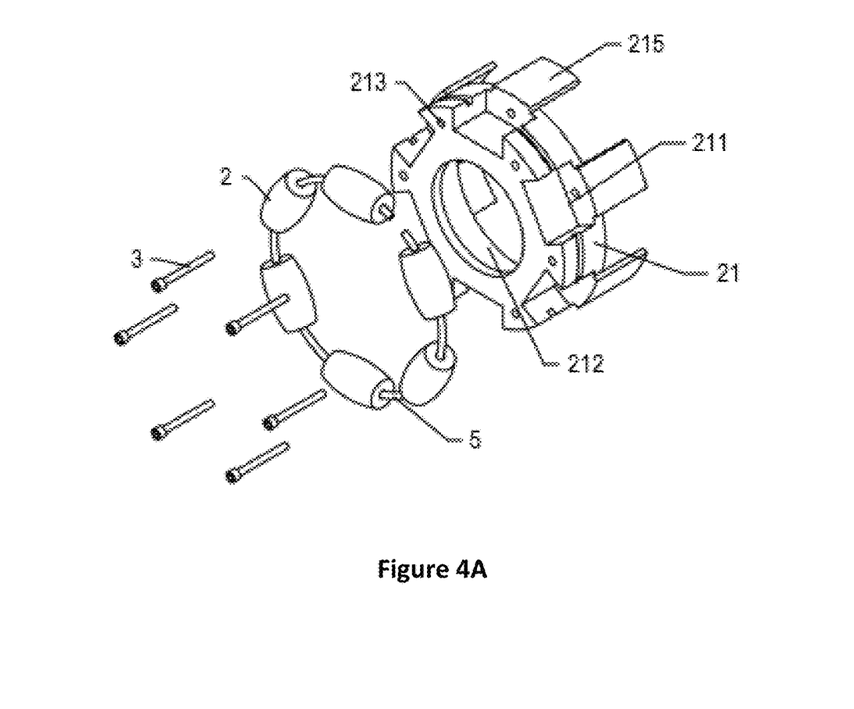
FIGS. 4a and 4b show exploded isometric and side views of a ring structure of the wheel assembly and its connection to the rollers through the screws according to a second embodiment of the present invention.
Figure 4B:
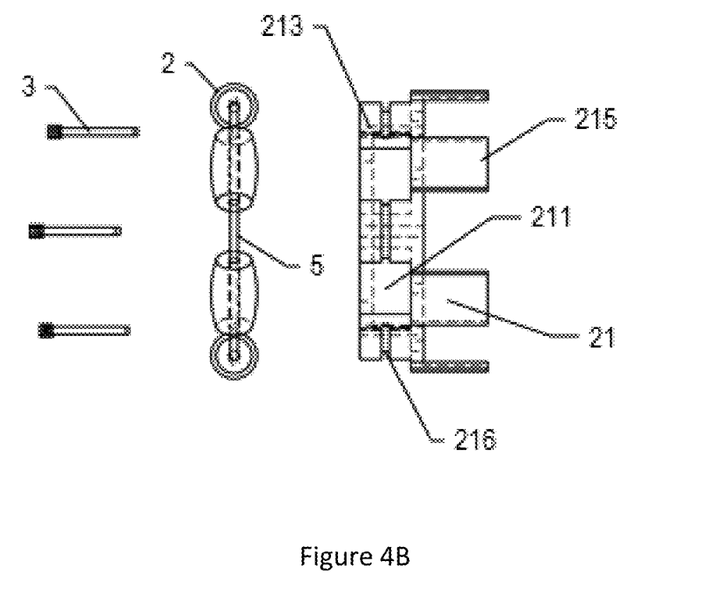
Figure 5:
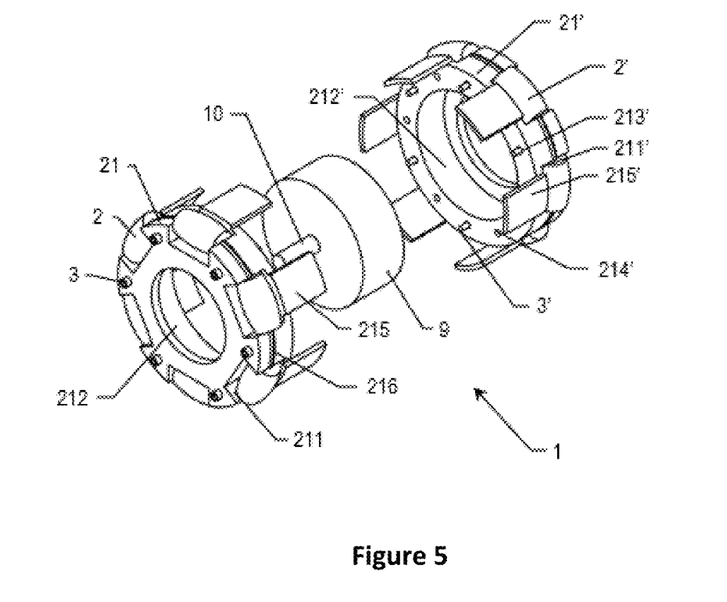
FIG. 5 shows an isometric view of the ring structure to be attached to the hub motor according to the second embodiment of the present invention.
Figure 6:
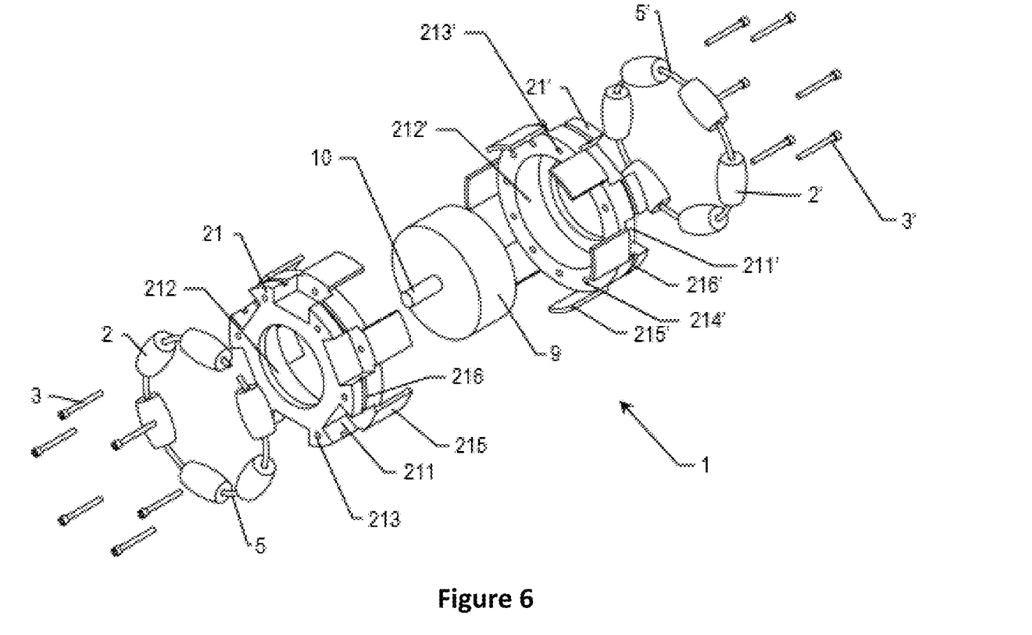
FIG. 6 shows an exploded isometric views of a complete wheel according to a second embodiment of the present invention.

FIGS. 2 and 3 show exploded isometric views of the first embodiment of the omni-directional motor-wheel 1 of the present invention and details the structure of this omni-directional motor-wheel 1 and its connection to a hub-motor 9. In this omni-directional motor-wheel 1, the hub-motor 9 is surrounded by the ring-shaped structure made of two ring structures 11, 11' and, more particularly, is housed within a hollow housing delimited by the inner radial surface 112, 112' of each ring structures 11, 11' which renders the omni-directional motor-wheel 1 compatible with different kinds of hub-motors 9. This structure increases the strength of the motor-wheel 1 as the motor 9 enhances the structural strength of the whole wheel 1 by being placed within the wheel-structure 11, 11' itself. To make the wheel 1 omni-directional, a sufficient number of rollers 2, 2' are embedded in the outer surface of the ring structure 11, 11' which can roll passively. While the motor-wheel 1 has a hollow ring shape, the strength of the structure does not decrease because the structure of the motor 9 will carry the pressure on the wheel 1. As it is noticeable from FIG. 2, the amount of material for producing the motor-wheel 1 decreases, compared to a similar wheel with the same dimensions. This feature reduces the production cost of the wheel 1 as well.

These FIGS. 2 and 3 show views of a motor-wheel 1 for an omni-directional motion vehicle, comprising a ring-shaped structure made of the ring structures 11, 11' with a central axis, presenting an outer radial surface and an inner radial surface 112, 112', whereby the outer radial surface comprises a plurality of rollers 2, 2' that are rotatable about an inclined axis relative to the central axis, and the inner radial surface 112, 112' is adapted to be connected to a hub-motor 9 such that the hub-motor 9 is a load bearing element of the wheel. Preferably, the motor-wheel actually comprises a hub motor 9 located within the housing partially surrounded by their inner radial surfaces 112, 112' so as to become a load bearing element of the wheel 1. The hub motor 9 may comprise a rotor 91 and a stator 92, adapted to be fixed to vehicles.

The two rings structures 11, 11' are adapted to be assembled together so as to sandwich said hub-motor 9 within the housing partially surrounded by their inner radial surfaces 112, 112' by pressing and pressuring the outer edge of the motor in the middle. Preferably, screws 3, 3' which are used for maintaining the rollers 2, 2' (see below) also maintain the two rings 11, 11' together. In order to do so, each ring 11, 11' comprises at least one, preferably but not necessarily threaded, through-hole 113, 113' and a threaded blind-hole 114, 114' such that once pressed together, the through hole 113, 113' of the first ring 11 faces the blind-hole 114', 114 of the second ring 11' and vice-versa so as to provide a continuous hole between the two rings 11, 11' for each screw 3, 3'.

By using this mechanism, no modification of the hub-motor 9 is needed and the thickness of the wheel's ring can be reduced as we don't need to extend the sides till the middle of the wheel to have access to the screws there.

As per the rollers 2, 2' represented in the above mentioned figures, we can see that the motor-wheel 1 comprises at least two sets of rollers 2, 2' each set of rollers being mounted on one ring structure 11, 11' of the ring-shaped structure.

As shown in the figures, at least one set of rollers 2, 2', or both, can comprise at least some rollers, or all rollers, which are linked to each other through a common rotating axis 5. According to an alternative embodiment, at least one set of rollers comprises rollers 2, 2' which are independent from each other, i.e. each roller has his own rotation shaft. This basically means, that the present invention is not particularly limited to the type of roller set and that the wheel 1 may have both independent rollers having their own shaft and separated from one another and/or a circular roller assembly having a common shaft, provided that their rotation axis is inclined, preferably perpendicular, to the wheel's central axis and that they are detachable from the ring structure.

As shown in the figures, in a preferred embodiment of the present invention, each roller 2, 2' is attached to the corresponding ring using fixing means such as both a holder 4 and a screw 3 (or a plurality of each) where each screw 3, 3' fix the holder 4, 4' on the ring 11, 11' which in turn fix the roller 2, 2' on the ring 11, 11', but the present invention is not limited to that. As shown, the roller 2, 2' and its shaft, or the rollers 2, 2' and their common shaft 5, 5', are placed in their respective roller place 111, 111' adapted to receive their roller and preferably consists in a recess within the ring structure 11, 11' as explained above.

The number of roller places 111, 111' is not particularly limited on a ring 11, 11' and mainly depends on the number and/or the length of the rollers 2, 2' and the perimeter of the ring. Additionally, one can attach the rollers 2, 2' by using a single string as the shaft 5, 5' for all rollers as represented in the figures. In this case, the string 5, 5' is possibly merely going through a longitudinal hole through the roller 2, 2' from one end to the other end of the roller. This possibility accelerates the production and the assembly of the rollers.

To summarize the above, we can see that in the first preferred embodiment, the modularity of the structure of the rollers 2, 2' enables the users of the omni-wheel to replace any defected roller without changing the whole structure of the wheel because the rollers and their shaft can have a one piece structure which can be installed and detached independently through the use of at least one roller holder 4, 4' or one screw 3, 3' (or both). Hence, the maintenance cost of this omni-wheel drops a lot. Furthermore, the isometric view of the rollers which are to be placed on the ring around the wheel structure shows that they are adapted to roll passively around their shaft which is preferably orthogonal to the motor shaft.

In case of use of a single string, the holders 4, 4' can be omitted and the ring structure can comprise a groove 216, 216' for receiving the string 5, 5' which is then blocked by the screws 3, 3' as shown in the embodiment of FIGS. 4a, 4b, 5 and 6. This embodiment also shows a different ring structure where each ring 21, 21' presents a plurality of complementary material extensions 215, 215' adapted to fit into each other and that enhance the robustness of the wheel. In this embodiment also, the screws 3, 3' preferably maintain the two rings 21, 21' together. In some embodiments, each ring-shaped structure 21, 21' has a central axis, presenting an outer radial surface and an inner radial surface 212, 212'. In some embodiments, the ring-shaped structure 21, 21' presents a plurality of recess portions 211, 211' adapted to receive rollers 2, 2'. In some embodiments, screws 3, 3' which are used for maintaining the rollers 2, 2' also maintain the two rings 21, 21' together. In order to do so, each ring 21, 21' comprises at least one through-hole 213, 213'

Figure 7:
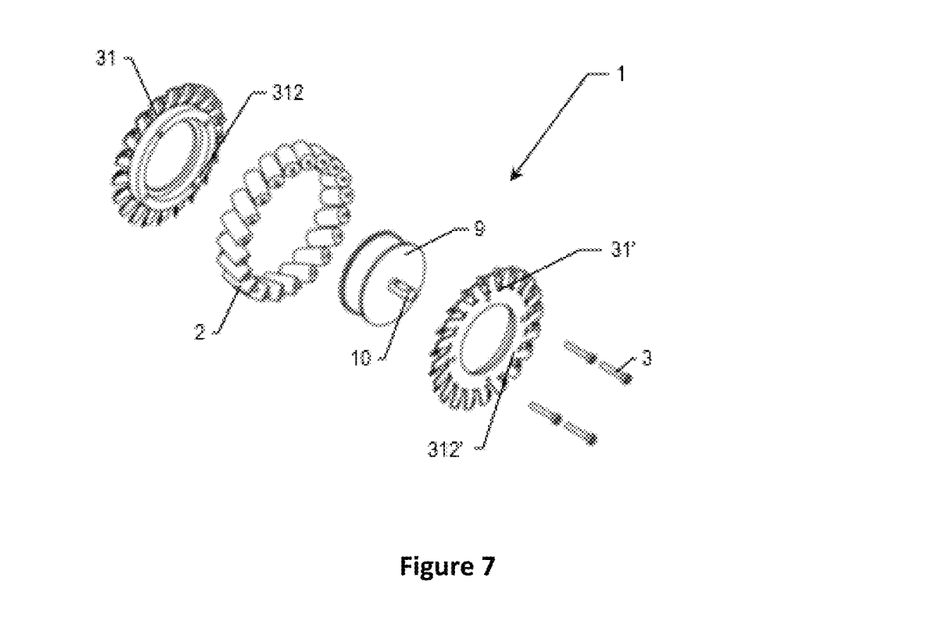
FIG. 7 shows an exploded isometric view of the ring structure to be attached to the hub motor according to a third embodiment of the present invention.

FIG. 7 shows an isometric view of the ring structure attached to the hub motor according to a third embodiment of the present invention where the wheel is a mecanum wheel comprising two rings structures 31, 31', rollers 2 and screws 3.

Figure 8:
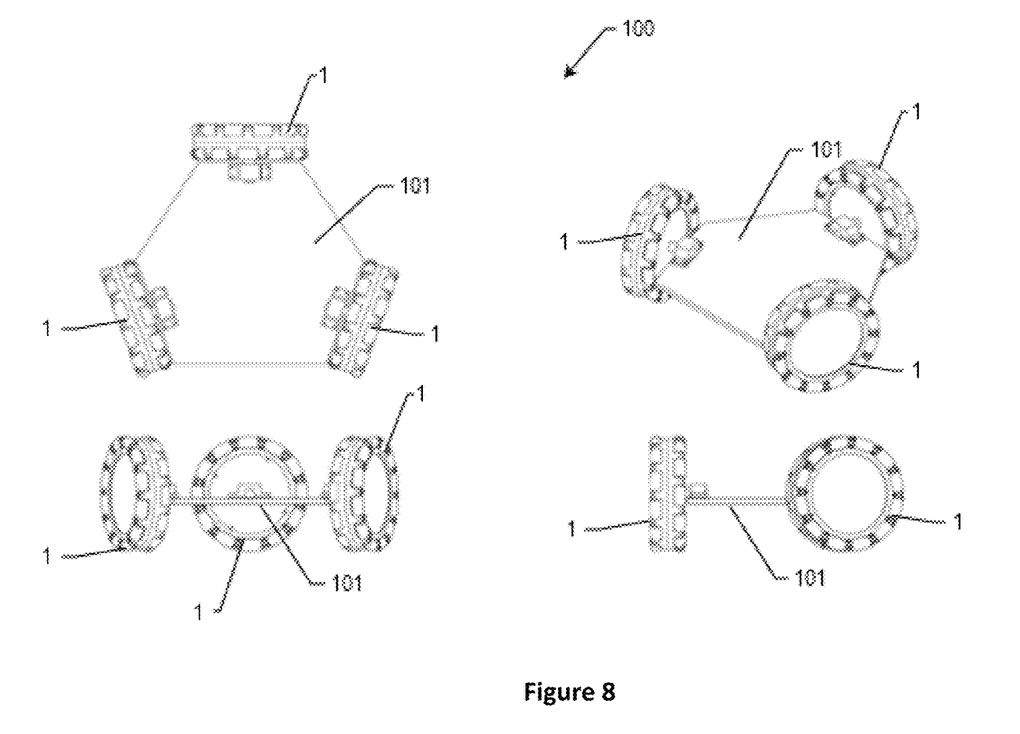
FIG. 8 is different isometric views of an omni-directional motion vehicle using three wheels of the present invention.

FIG. 8 shows different isometric views of the second aspect of the invention, which is a vehicle 100 in which the motor-wheels 1 of the first, second or third embodiment of the invention can be used for having an omni or mecanum directional motion mechanism. It preferably includes a deck 101 which holds the several shafts 10 of the hub-motors and the three (represented) or more motor-wheel structures 1 as an omni directional vehicle. These three motor-wheels enable the device to move omni-directionally. The vehicle itself is mechanically stable and no gyroscope sensor is needed for the balance. In this figure, three omni wheels of the present invention are shown which are disposed in the same horizontal plane and spaced by 120° between them and each have an in-wheel/hub motor in it and the shaft of the stator of the motor has been detachably/attached to the deck through a lock/unlock mechanism.

While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the scope of this disclosure. This for example particularly the case regarding the number of rollers or the exact geometry of the rollers which can be used.

The invention claimed is:

1. A motor-wheel for an omni-directional or mecanum motion vehicle, comprising a ring-shaped structure with a central axis, presenting an outer radial surface and an inner radial surface, whereby
   the outer radial surface comprises a plurality of rollers that are rotatable about an inclined axis relative to the central axis, and
   the inner radial surface is adapted to be connected to a hub-motor such that the hub-motor is a load bearing element of the wheel,
   wherein the ring-shaped structure comprises two rings adapted to be assembled together so as to sandwich said hub-motor within a housing partially surrounded by inner radial surfaces of said rings.

2. The motor-wheel according to claim 1, wherein each of said rings presents a plurality of recess portions adapted to receive the rollers.

3. The motor-wheel according to claim 1 comprising two sets of rollers, each set of rollers being mounted on one ring of the ring-shaped structure.

4. The motor-wheel according to claim 3, wherein at least one set of rollers comprises rollers which are independent from each other.

5. The motor-wheel according to claim 3, wherein at least one set of rollers comprises at least two rollers linked to each other through a common rotating axis.

6. The motor-wheel according to claim 5, wherein the rotating axis is perpendicular to the central axis.

7. The motor-wheel according to claim 1 wherein the rollers are detachably mounted on the ring shaped structure.

8. The motor-wheel according to claim 1, wherein the rollers are detachably mounted on the ring-shaped structure through the use of screws.

9. The motor-wheel according to claim 8, wherein the rollers are detachably mounted on the ring-shaped structure through the use of holders fixed by the screws.

10. The motor-wheel according to claim 8, wherein the screws also maintain the two rings together.

11. The motor-wheel according to claim 1 wherein the hub motor comprises a rotor fixed to the ring shaped structure and a stator comprising a shaft and adapted to be fixed to a vehicle.

12. An omni-directional motion vehicle comprising a deck and at least three motor-wheels as claimed in claim 1.

13. The omni-directional motion vehicle according to claim 12, wherein the three wheels are disposed in a horizontal plane and spaced by 120° between said wheels.

* * * * *